United States Patent

Cloos

[11] 4,410,786
[45] Oct. 18, 1983

[54] METHOD OF ALIGNING A WELDING TORCH WITH A SEAM TO BE WELDED AND OF WELDING SUCH SEAM

[75] Inventor: Erwin Cloos, Haiger, Fed. Rep. of Germany

[73] Assignee: Carl Cloos Schweisstechnik GmbH, Haiger, Fed. Rep. of Germany

[21] Appl. No.: 296,727

[22] Filed: Aug. 27, 1981

[30] Foreign Application Priority Data

Jan. 30, 1981 [DE] Fed. Rep. of Germany ....... 3103016

[51] Int. Cl.$^3$ ............................................. B23K 9/12
[52] U.S. Cl. ........................... 219/124.22; 219/125.12
[58] Field of Search ........... 219/124.1, 124.22, 124.34, 219/125.1, 125.11, 125.12

[56] References Cited

U.S. PATENT DOCUMENTS 4,249,062 2/1981 Hozumi et al. ................. 219/124.34
4,255,643 3/1981 Balfanz ............................ 219/124.34
4,258,425 3/1981 Ramsey et al. .................. 219/124.34

*Primary Examiner*—C. C. Shaw

*Attorney, Agent, or Firm*—Flynn, Thiel, Boutell & Tanis

[57] ABSTRACT

A method of locating and welding a seam with a welding torch includes the steps of swinging the welding torch transversely of its feed direction, moving the torch at an angle of up to 30° with respect to a preprogrammed torch path, operating the torch at a low welding current, and comparing welding current or voltage values measured at the laterally outermost points of the torch movement until such values are substantially equal, indicating the torch is centered over the seam. Thereafter, the torch is moved rearwardly along the seam until the measured voltage or current values indicate an end of the seam has been reached, and the torch is then supplied with full welding current and is moved forwardly along the seam at relatively high speed according to the preprogrammed path in order to weld the seam. In a preferred refinement of this method, the torch is slowed and swung laterally at selected locations along the preprogrammed path, and voltage or current values are again measured, compared, and used to center the torch over the actual seam.

4 Claims, 1 Drawing Figure

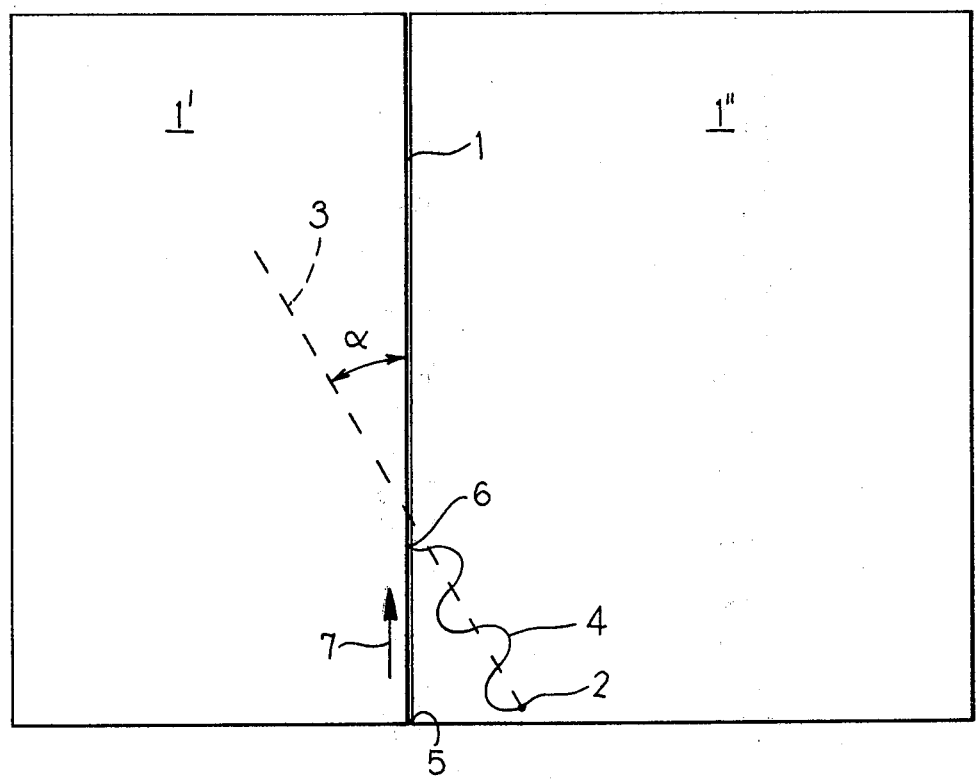

4,410,786

METHOD OF ALIGNING A WELDING TORCH WITH A SEAM TO BE WELDED AND OF WELDING SUCH SEAM

FIELD OF THE INVENTION

This invention relates to a method of welding and, more particularly, to a method of independently locating and welding seams, particularly welding-seam beginnings, the course of which seams is actually known and preprogrammed, wherein for lateral and elevational control of the welding torch, the welding-current or voltage changes caused by enlarging or reducing the length of the arc are used.

BACKGROUND OF THE INVENTION

German Offenlegungsschrift No. 26 45 788 discloses a mechanized welding system having a welding torch which is periodically swung laterally (transversely) of the welding seam. The welding current is measured at the laterally outermost points (turning points) of the swinging movement and, based on a comparison of the two values obtained, the welding head is, if necessary, moved so as to be more accurately centered over the seam. A similar method, namely measuring the welding-current strength and then comparing this value with a predetermined value, is utilized for adjusting the welding torch elevationally of (toward or away from) the seam. It is possible for the latter comparison to use the welding current at the seam center. The advantage of this lateral and elevational scanning is that the welding torch can automatically be guided at a predetermined elevation above and laterally along a welding seam which is not known in its course. However, it is disadvantageous that this manner of guiding the welding torch requires a constant swinging of the same, which causes the welding speed along the welding seam to be considerably slowed down.

Furthermore, mechanized welding systems are known in which the welding torch is moved according to a predetermined program which corresponds with the anticipated course of the seam. The advantage of this type of control of the welding torch is that swinging movements to determine the seam center are not needed, which results in a high welding speed. However, it has been found in practice that, for satisfactory functioning of such a welding system, the actual course of the seam must correspond exactly with the preprogrammed one. If deviations occur, as can easily happen in practice due to alignment errors or due to tolerances, then there exists the risk that the preprogrammed welding seam is positioned next to the actual seam or only partially covers it, so that the resulting weld is insufficient and perhaps faulty. A particular problem involves locating the start of the seam. Based on the above-mentioned alignment and tolerance errors, it is often the case that the start of the seam remains unwelded.

A basic purpose of the invention is therefore to provide a method for locating and welding preprogrammed welding seams, with which the beginning of the seam can be located and welded satisfactorily and in which a satisfactory weld can be achieved even in the case of positioning errors and/or deviations due to tolerances in the seams to be welded.

SUMMARY OF THE INVENTION

This purpose is attained inventively by providing a method in which the welding torch swings laterally with respect to its feed direction, is operated with little welding current and is moved at an angle of up to 30° with respect to the preknown course of the seam in order to locate the seam, in which the welding torch, after detecting the welding seam, is moved back to the beginning of the seam while maintaining the low welding-current strength and, if desired, the swinging movement, and in which the torch is subsequently moved along the welding seam with a high welding current and without a swinging movement in order to weld the seam.

BRIEF DESCRIPTION OF THE DRAWINGS

The invention is described in greater detail hereinafter in connection with the drawing, which illustrates diagrammatically movement of a welding torch relative to a welding seam defined by two abutting workpieces.

DETAILED DESCRIPTION

Referring to FIG. 1, a welding seam 1 is defined by the abutting edges of two workpieces 1' and 1".

In the inventive method, it is not necessary for the welding torch to be moved exactly to the beginning point of the seam and to then start the welding operation. Rather, in the inventive method, the welding-seam beginning, which does not always lie at the preprogrammed point, due to positioning errors and deviations due to tolerances, is initially passed by the torch so that the welding seam is detected at a location a certain distance from the start of the seam. The exact alignment of the welding torch with respect to the seam center then occurs in a conventional manner through the swinging movement of the torch and the welding-current values which are determined at the turning points of the torch. It is advantageous, for precisely determining the location of the welding seam, to move the torch from an initial point 2 toward the welding seam along a line 3 which forms an angle α of up to approximately 30° to the preprogrammed seam 1, in order to avoid a situation in which the welding torch is moved parallel to the actual welding seam 1. The torch is simultaneously swung transversely of the line 3, and it thus follows the path 4. After locating the welding-seam center at 6, the welding torch is moved opposite the welding direction 7 with a low welding-current strength until the end 5 of the seam is detected. Through this, on the one hand, the exact start of the seam is determined and, on the other hand, the seam becomes aligned with respect to the coordinate system of the welding torch. Thus, it is possible, in a simple manner, to detect a deviation of the starting point of and/or the direction of the seam from the preprogrammed information, so that the preprogrammed course of the welding torch can be corrected accordingly. The welding of the seam 1 occurs thereafter in the direction 7 with a high welding speed and the requisite welding current.

This type of control is generally sufficient. In the case of larger deviations due to tolerances and/or larger positioning errors, however, it may be necessary to subsequently compare the preprogrammed course of the seam with the actual course of the seam and to again move the welding torch to the center of the seam. To achieve this, it is provided inventively that, while welding, the welding torch is moved relatively quickly a predetermined distance without swinging along the preprogrammed welding seam and subsequently, at a slower forward speed, carries out several swinging movements in order to again locate the center of the seam. This is again followed by the quick forward movement, such that the cycle is repeated. With the help of this method, it is possible to weld, at high speed, with great economic feasibility and with exactness, seams which differ significantly from the preprogrammed course.

The finding of the beginning of the seam is preferably and advantageously carried out with a welding current which is approximately 1/5 to ⅓ of the welding current needed for welding the seam.

The embodiments of the invention in which an exclusive property or privilege is claimed are defined as follows:

1. A method of using an arc welding tool movable relative to a workpiece means to locate and weld a welding seam which is provided in said workpiece means and has a predetermined path, comprising the steps of: simultaneously supplying said tool with a low welding current, moving said tool along a line which is adjacent said workpiece means and is arranged at an acute angle of up to 30° with respect to said predetermined path of said welding seam, swinging said tool transversely of said line, and sensing variations in said low welding current caused by changes in the distance between said tool and said workpiece means until the sensed magnitude of said low welding current indicates said tool is aligned with said welding seam; thereafter simultaneously supplying said tool with said low welding current, moving said tool along said welding seam, and sensing variations in said low welding current until the sensed magnitude of said low welding current indicates said tool is aligned with a first end of said welding seam, and thereafter simultaneously supplying said tool with a high welding current and moving said tool at a higher rate of speed along said predetermined path of said welding seam toward a second end thereof.

2. The method according to claim 1, including the step of swinging said tool transversely of said welding seam as said tool moves along said seam toward said first end thereof.

3. The method according to claim 1, including the steps of moving said tool a predetermined distance along said predetermined path of said welding seam toward said second end thereof at said higher rate of speed; thereafter swinging said tool transversely of said welding seam several times, sensing variations in said welding current caused by changes in the distance between said tool and said workpiece means, and adjusting the position of said tool in response to the sensed magnitude of said welding current until said tool is aligned with the center of said welding seam; and subsequently moving said welding tool along said predetermined path of said welding seam at said higher rate of speed free of swinging movement transversely of said welding seam.

4. The method according to claim 1, wherein the magnitude of said low welding current is approximately 1/5 to ⅓ the magnitude of said high welding current.

* * * * *